United States Patent [19]

Watanabe et al.

[11] Patent Number: 4,874,247

[45] Date of Patent: Oct. 17, 1989

[54] MEASUREMENT POSITION SYNCHRONIZATION METHOD FOR A SCANNING DENSITOMETER

[75] Inventors: Hideo Watanabe; Yoshiaki Kurata, both of Ibaraki, Japan

[73] Assignee: Komori Printing Machinery Co., Ltd., Tokyo, Japan

[21] Appl. No.: 128,693

[22] Filed: Dec. 4, 1987

[30] Foreign Application Priority Data

Dec. 8, 1986 [JP] Japan ................................ 61-290505

[51] Int. Cl.[4] ................................ G01J 3/50

[52] U.S. Cl. ................................ 356/402; 250/226

[58] Field of Search ................................ 356/402; 250/226

[56] References Cited

U.S. PATENT DOCUMENTS

| | | | |
|---|---|---|---|
| 4,003,660 | 1/1977 | Christie, Jr. et al. | 250/226 X |
| 4,494,875 | 1/1985 | Schramm et al. | 250/226 X |
| 4,505,589 | 3/1985 | Ott et al. | 250/226 X |

*Primary Examiner*—Vincent P. McGraw

[57] ABSTRACT

There is disclosed a measurement position synchronization method applied to a scanning densitometer to photoelectrically scan a control strip comprising a plurality of color patches of respective colors printed on a paper to thereby calculate densities of the color patches every respective colors. This method comprises: the steps of responding to a measured values obtained by scanning a color patch of a specified color to calculate points which have varied respectively by predetermined values on the side of a reference level included in the measured values; determining the intermediate point of the both points calculated to be an actual measurement central point of the color patch of the specified color; and carrying out synchronization of measurement positions in accordance with a difference between a scheduled central point and the actual measurement central point. This method is applicable also to a scanning densitometer to photoelectrically scan a control patch comprising a plurality of color patches of respective colors printed on a paper and formed every ranges divided in a transverse direction to thereby calculate densities of the color patches every said ranges and every respective colors.

9 Claims, 8 Drawing Sheets

MEASUREMENT POSITION SYNCHRONIZATION METHOD FOR A SCANNING DENSITOMETER

BACKGROUND OF THE INVENTION

The present invention relates to a method of synchronizing a measurement position of a scanning densitometer to photoelectrically scan small square printing surfaces containing respective colors called color patches, printed on an upper side blank portion etc. of a paper when a multi-color printing is implemented, and more particularly to a method to correct an asynchronous state of a measurement position produced by a difference between a scheduled color patch position and a color patch position determined depending upon a manner in which a paper is actually placed or mounted.

Scanning densitometers are used with a view to using a standard printing surface density as a reference to adjust a quantity of an ink supplied to a printing machine in accordance with a measured result of the printing surface density of a sample paper extracted during printing, thereby allowing the printing surface density to be in correspondence with the standard printing surface density. In operation, such densitometers photoelectrically scan a control strip constituted by connecting or joining color patches in each color serving as small square printing surfaces and printing them to an upper side blank portion etc. of a paper in the form of a ribbon. In such a scanning, photoelectric conversion is carried out every colors, e.g., black, red, blue and yellow etc., thus to take out outputs detected from color patches of corresponding colors as measured ouputs of respective colors.

In this case, since the printing surfaces are opposite to the ink supply roller and an adjustment of an ink supply quantity is made by a plurality of blades divided in the axial direction of the roller, color patches of respective colors are printed every divisional ranges divided in a transverse direction, i.e., in left and right directions with the color patches being connected or joined to constitute a series of control strips as a result of the fact that these color patches are connected or joined in the form of a ribbon. When a paper on which a control strip is printed is placed or mounted on a paper table to apply scanning to the paper along the control strip using a scanning densitometer, respective color patch positions of the control strip are shifted depending upon the mounting condition of the paper, so that they are not in correspondence with the scheduled positions of respective color patches, resulting in occurrence of asynchronism of measurement position due to the discrepancy between both positions. As a result, measured outputs do not correspond to outputs from only color patches of the scheduled colors, resulting in occurrence of a measurement error based thereon.

For the countermeasure therefor, there has been ordinarily employed in the art a method to artificially mark respective measurement designation positions in the vicinity of the control strip using a pen etc. to thereby determine the measurement positions of respective color patches to memorize these measurement positions at subsequent times to conduct only the measurement of the respective measurement positions, and a method to draw attention to the fact that color distinction, dimension in arrangement, form or configuration and the like are determined in advance to detect a color patch of a specified color by a change in measured density between adjacent color patches to conduct a measurement of color patches of respective colors with the color patch detected being as a standard of measurement.

However, with the method to designate respective measurement positions by marking a conduct a measurement on the basis of the memorization thereof, if shift of mounting condition of a paper, expansion and contraction of a paper, a deviation of printing site etc. occur, the measurement becomes inaccurate. On the other hand, with the method to detect a change in measured density between adjacent color patches to thereby determine the standard of measurement, when the form of the control strip is changed, there occurs the problem that this method cannot be applied as it is.

SUMMARY OF THE INVENTION

With the above in view, an object of the present invention is to provide a measurement position synchronization method for a scanning densitometer wherein even if the relative positional relationship between the scanning densitometer and a control strip becomes inaccurate in dependance upon the mounting condition or expansion and contraction of a paper, or deviation of a printing position, synchronization of measurement positions is automatically set in accordance with the form of the control strip, thus making it possible to precisely measure densities for printing of respective color patches.

The above-mentioned object is achieved by a measurement position synchronization method applicable to a scanning densitometer of the first type to photoelectrically scan a control strip comprising a plurality of color patches of respective colors printed on a paper to thereby calculate densities of color patches in each color, and is also applicable to a scanning densitometer of the second type to photoelectrically scan a control strip comprising a plurality of color patches of respective colors printed on a paper and formed in ranges divided in a transverse direction to thereby calculate densities of color patches in each range for each respective color, the method comprising the steps of detecting to a measured values by scanning a color patch of a specified color, calculating points which have varied respectively by predetermined levels on the side of a reference level of the measured values, determining the intermediate position of the both points calculated to be an actual measurement central point of the color patch of the specified color, and carrying out synchronization of the measurement position in accordance with a difference between a scheduled central point and the actual measurement point.

Accordingly, points which have varied respectively by predetermined levels with respect to a fixed level of a measured output obtained by scanning a color patch of a specified color define an effective measurement range of the color patch. Thus, the intermediate points of both points which have varied by the predetermined levels will be obtained as an actual measurement central point in the effective measurement range. Therefore, since the difference between the actual measurement central point and a scheduled central point is considered as an error in the synchronization of position, synchronization of the measurement position is carried out so as to cancel such an error, thereby making it possible to pricisely determine the measurement positions of the respective color patches.

In the measurement position synchronization method applicable to the scanning densitometer of the first type, only one synchronization control is first conducted, while in the measurement position synchronization method applicable to the scanning densitometer of the second type, synchronization control is repeatedly conducted for respective ranges corresponding to the blades.

BRIEF DESCRIPTION OF THE DRAWINGS

Figures show an embodiment according to the present invention.

DETAILED DESCRIPTION OF PREFERRED EMBODIMENT

The present invention will be described in detail in connection with preferred embodiments with reference to attached drawings.

Figure 2:
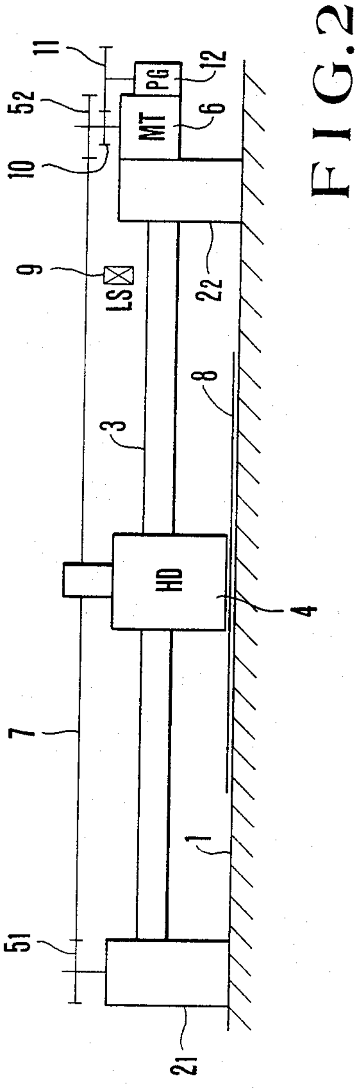
FIG. 2 is a side view showing a scanning densitometer.

FIG. 2 is a side view of a scanning densitometer. This scanning densitometer includes a paper table 1, supports $2_1$ and $2_2$ provided transversely on the both sides of the paper table 1, a guide rail 3 horizontally supported by the supports $2_1$ and $2_2$ and a measurement head (which will be abbreviated as "HD" hereinafter) 4 slidably engaged with the guide rail 3 so that it is movable in a horizontal direction. The scanning densitometer further includes a pulley $5_1$ supported by the support $2_1$, another pulley $5_2$ of a motor (which will abbreviated as "MT" hereinafter) fixed to the support $2_2$, and a drive belt 7 such as a synchro-belt or a chain suspended between the pulleys $5_1$ and $5_2$ and fixed above the HD 4. Thus, the HD 4 moves from the right to left end at the upper portion of the figure in accordance with the rotation of the MT 6 to thereby sequentially apply photoelectric scanning of a control strip horizontally printed on a paper 8 which is mounted on the paper table 1 and is sucked by a vacuum sucker etc. (of which indication is omitted)

Further, the scanning densitometer includes a limit switch (which will be abbreviated as LS hereinafter) which is fixed to the guide rail 3 to detect the beginning of the measured by the HD 4 in response to the contact of the HD 4. A rotary pulse generator (which will be abbreviated as PG hereinafter) 12 such as a rotary encoder coupled through the MT 6 and gears 10 and 11 are provided. Thus, the rotary pulse generator 12 generates pulses in accordance with the rotation of the MT 6 to indicate movement distance of the HD 4 by the number of pulses.

Figure 3:
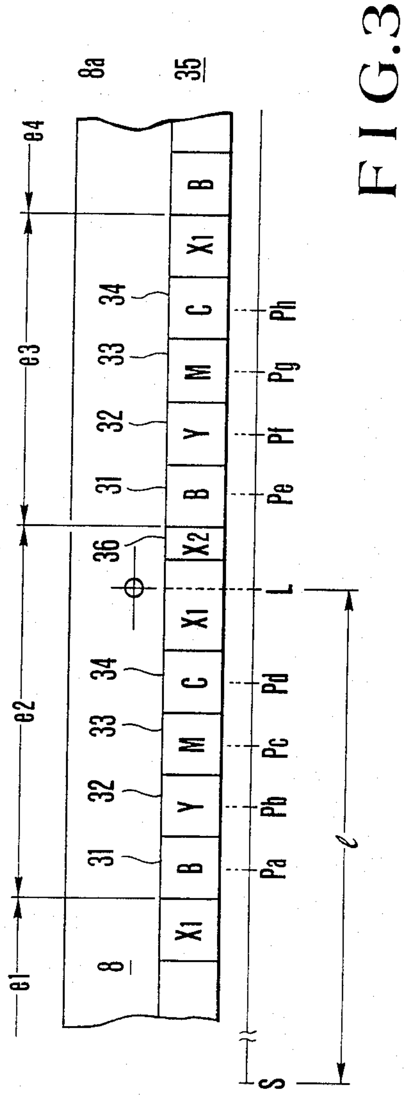
FIG. 3 is a view showing an example of a control strip.

FIG. 3 shows a control strip. As seen from this figure, small square printing surfaces of respective colors of black (B), yellow (Y), magenta (M) and cyanogen (C) are printed, e.g., on an upper side blank portion 8*a* of the paper. They are connected or joined to each other as color patches 31 to 34 in ranges $e_1$ to $e_4$ divided in a transverse direction in correspondence with respective blades. They are further connected or joined to each other and are printed in a horizontal direction in the form of a ribbon to constitute a control strip 35.

In addition to the color patches 31 to 34, with a view to checking how halftones formed on a printing block are formed according to need, patches $X_1$ for checking an enlarged transfer of the halftones and patches $X_2$ for checking modified transfer of halfpoints are interposed.

Placing or mounting the paper 8 on the paper table 1 is carried out by allowing a reference mark 36 of the paper 8 or a specified patch to be in correspondence with a point L away from an origin S determined in advance on the paper table 1 by a fixed distance l to thereby regulate the relative relationship between the mechanism shown in FIG. 2 and the control strip. Thus, scheduled central points $P_a$ to $P_h$ of the color patches 31 to 34 are determined in accordance with the movement of the HD 4.

Figure 1:
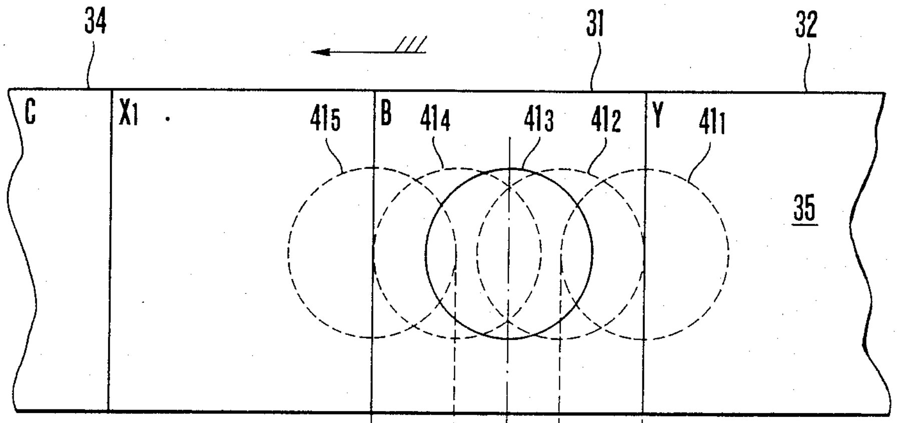
FIG. 1 is a view for explaining the principle of the invention.
Figure 1:
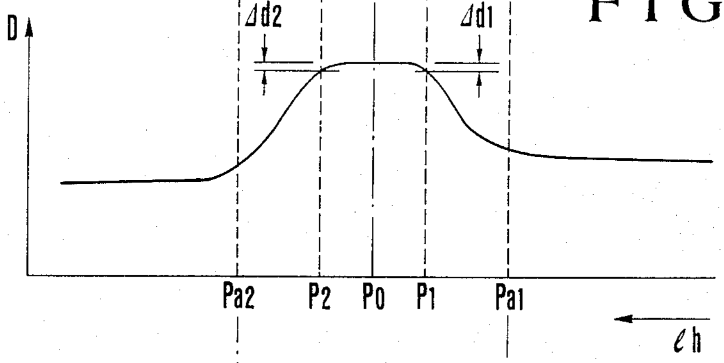
Figure 1:
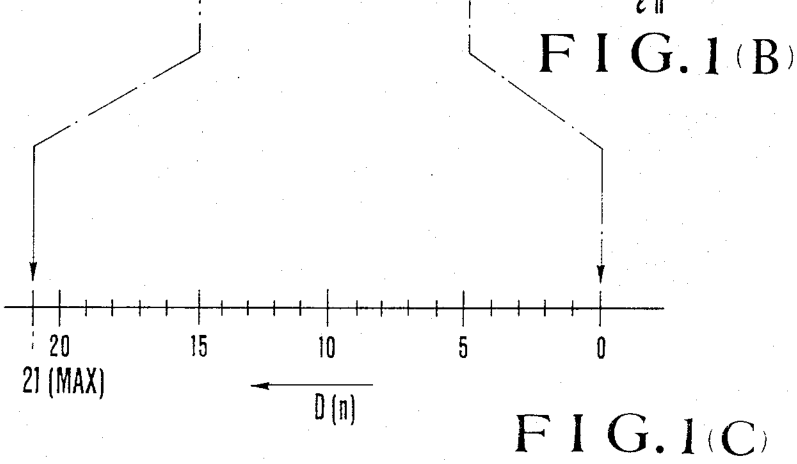

FIG. 1 is a view showing the principle of the present invention wherein FIG. 1(A) is an enlarged view of the essential part of the control strip 35, FIG. 1(B) is a view showing the relationship between the movement distance $l_h$ of the HD 4 and the measured output D, and FIG. 1(C) is a view showing data number D(n) used in the case of applying sampling measured outputs at a fixed period in accordance with the movement of the HD 4 to convert sampled outputs to a digital signal to store them in succession into respective addresses of a memory in accordance with a movement direction of the HD 4 indicated by an arrow.

The detection by the photoelectric device of the HD 4 is carried out in a manner indicated by the spot 41 as shown in FIG. 1(A). The scanning of the spots $\mathbf{41}_1$ to $\mathbf{41}_5$ and the control strip 35 is conducted in accordance with the movement in a direction indicated by the arrow accordingly the measured output D of the HD 4 changes as shown in FIG. 1(B). Particularly in the B patch 31, as a specified color, the difference between the measured output at the Y patch 32 and that at the patch Xon the both sides thereof becomes large.

When the spot $\mathbf{41}_3$ is present at the central portion of the B patch 31, the level of the measure output D is equal to a substantially fixed level. In contrast, when spots $\mathbf{41}_1$, $\mathbf{41}_2$, $\mathbf{41}_4$ and $\mathbf{41}_5$ are present on the both sides thereof, the level of the measured output D lowers. Thus, points $P_1$ and $P_2$ which have respectively varied by predetermined levels $\Delta d_1$ and $\Delta d_2$ on the side of both ends of the B patch 31 with respect to the fixed level of the measured output D are calculated. Then, the intermediate point of the both points $P_1$ and $P_2$ is determined to be an actual measurement central point $P_o$ of the B patch 31. Thus, the central point of the B patch 31 is calculated irrespective of the position deviation of the control strip 35 based on the condition where the paper 8 is mounted or placed on the paper table 1 and various factors. By correcting the measurement position in accordance with a difference between the central point of the B patch as a reference and a scheduled point to calculate measured outputs D of respective color patches 31 to 34, synchronization of the measurement position can be carried out.

Accordingly, by successively storing respective data based on measured outputs D of O to PMAX as shown in FIG. 1(C) into the memory in accordance with the scanning by the spots $\mathbf{41}_1$ to $\mathbf{41}_5$, thereafter to calculate points $P_1$ and $P_2$ using respective data D(O) to D(PMAX), the adjustment quantity can be calculated using the following equation.

$$ADJ = \frac{PMAX}{2} - \frac{P_1 + P_2}{2}$$

In this instance, since D to PMAX are determined in accordance with the both boundary positions $P_{a1}$ and $P_{a2}$ of the B patch 31 scheduled in advance and PMAX indicates the distance between the both boundary positions $P_{a1}$ and $P_{a2}$, PMAX/2 is a scheduled central point.

Figure 4:
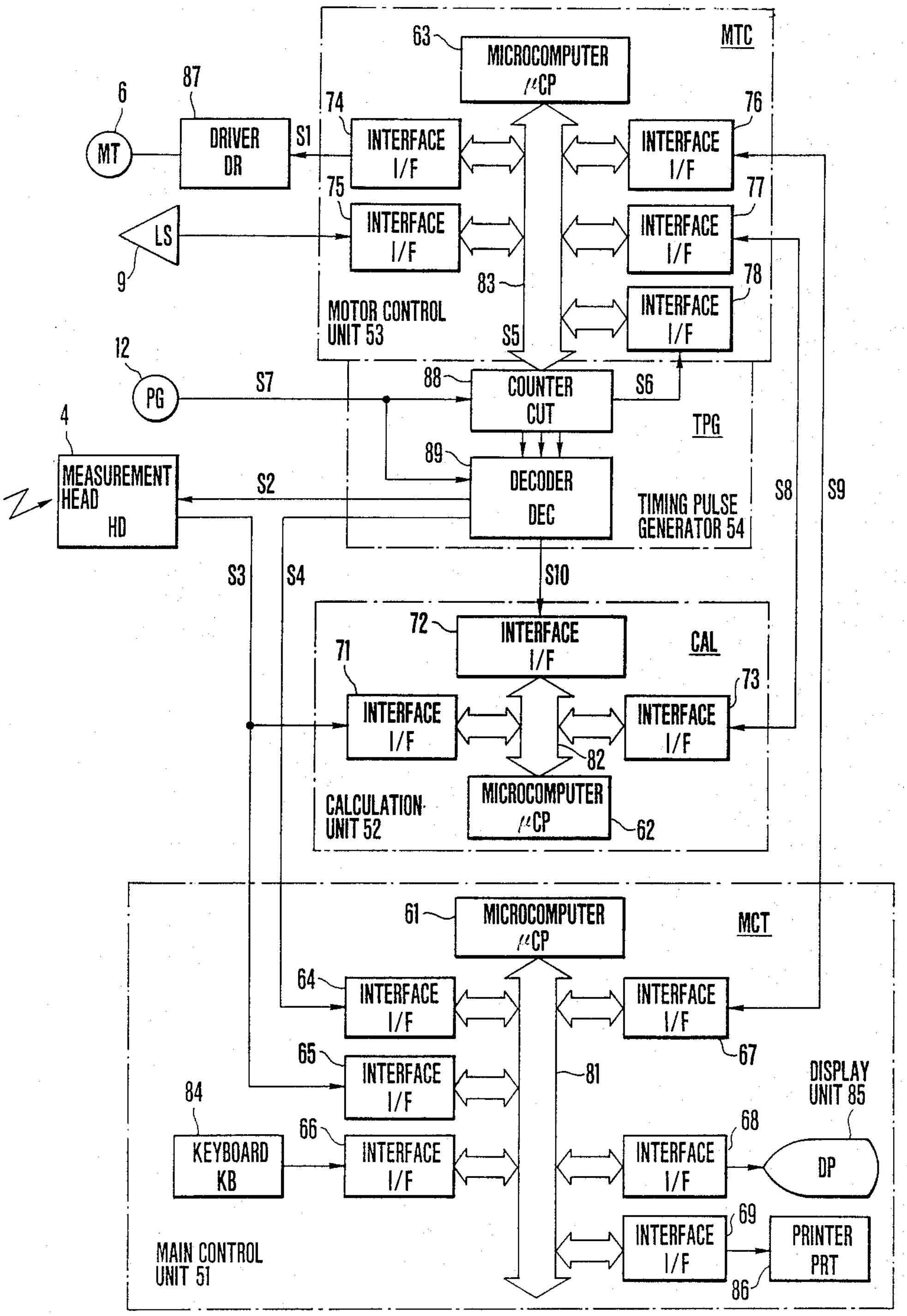
FIG. 4 is a block diagram showing the circuit arrangement.

FIG. 4 is a block diagram showing the circuit arrangement for implementing the method according to the present invention. This circuit arrangement includes a main control unit (which will be abbreviated as MCT hereinafter) 51, a calculation unit (which will be abbreviated as CAL hereinafter) 52, a motor control unit (which will be abbreviated as MTC hereinafter) 53, and a timing pulse generator (which will be abbreviated as TPG hereinafter) 54. These units MCT 51, CAL 52 and MTC 53 includes, as main components, microcomputers (which will be abbreviated as μCP hereinafter) 61 to 63 each comprising a processor (which will be abbreviated as CPU hereinafter) such as a microprocessor, a fixed memory (which will be abbreviated as ROM hereinafter), a variable memory (which will be abbreviated as RAM), and the like, respectively. These units further include interfaces (which will be abbreviated as I/F hereinafter) 64 to 69, 71 to 73, and 74 to 78 arranged around the microcomputers 61 to 63, respectively wherein the interfaces 64 to 69 are connected by a bus 81, the interfaces 71 to 73 are connected by a bus 82, and the interfaces 74 to 78 are connected by a bus 83. In the MCT 51, a keyboard (which will be abbeviated as KB hereinafter) 84 is connected to the I/F 66, and a display unit such as a cathode ray tube (which will be abbreviated as DP hereinafter) 85 and a printer (which will be abbreviated as a PRT hereinafter) 86 are connected to the I/F 68 and 69, respectively.

Further, a drive signal S1 for the MT 6 is sent from the I/F 74 of the MTC 53 via a driver (which will be abbreciated as DR hereinafter) 87. A detection signal S 11 from the LS 9 is delivered to the I/F 75. A counter (which will be abbreviated as CUT hereinafter) 88 of the TPG 54 is connected through the bus 83. An output pulse S7 of the PG 12 is delivered to the CUT 88. A decoder (which will be abbreviated as DEC hereinafter) 89 generates various timing pulses on the basis of the count output of the CUT 88 and the output pulse S7 of the PG 12, to send a measurement instructing signal S2 to the HD 4 and to send strobe signals S 4 and S 10 for instructing taking-in of a measured output of the HD 4 to the I/F 64 of the MCT 51 and the I/F 72 of the CAL 52, respectively. In addition, the CUT 88 sends a status signal S6 to the I/F 78 of the MTC 53.

On the other hand, the measured output S3 of the H4 is delivered to the I/F 65 of the MCT 51 and to the I/F 71 of the CAL 52. Responding to this, the μCP 62 of the CAL 52 performs computation of the synchronization correcting quantity to send this data by transmission and reception of a data signal S8 to and from the I/F 77 of the MTC 53 via the I/F 73, and performs the computation of number corrsponding synchronization detection number command from the MTC 53. By transmission and reception of a data signal S9 between the I/F 67 of the MCT 51 and the I/F 76 of the MTC 53, respective data corresponding to the form of the control strip set by the KB 84 may be delivered to the μCP 63.

In this embodiment, the CPUs of the μCPs 61 to 63 execute instructions stored in ROMS to perform predetermined operations while accessing necessary data to the ROM, respectively. When the CPU in the μCP 61 of the MCT 51 responds to the manipulation of the KB 84 to send respective data and commands to the MTC 53 through the I/F 67, the CPU in the μCP 63 of the MTC 53 drives MT 6 through the I/F 74 and the DR 87 in response thereto. As shown in FIG. 2, the movement of the HD 4 is initiated. As a result, an output pulse S7 corresponding thereto is delivered from the PG 12 to the CUT 88 and the DEC 89 of the TPG 88. Thus, the CUT 88 counts a movement distance $l_h$ of the HD 4 to deliver this count value to the μCP 63 through the bus 83 and to the DEC 89. As a result, the DEC 89 initiates generation of respective timing pulses.

It is to be noted that the CUT 88 is composed of a plurality of counters which are used for counting the total movement distance of the HD 4, for counting a distance when the HD 4 moves between the color strips 31 to 34, and for any other counting purpose.

When the HD 4 passes through the LS 9 in accordance with the drive of the MT 6, the CPU of the μCP 63 responds to a detection output of the LS 9 to instruct the CUT 88 to initiate measurement. In response to this, the DEC 89 sends a signal S2 on the basis of a count value of the CUT 88 to thereby instruct the HD 4 to conduct sampling of a detection output of a photoelectric device and a conversion to a digital signal or any other necessary operation, and to send strobe signals S4 and S10. Responding to this, measured outputs S3 from the HD 4 are sequentially taken in at the MCT 51 and the CAL 52. The CPU in the μCP 61 of the MCT 51 executes measured output averaging processing every color patches 31 to 34 and carries out the sending of data thus processed to the DP 85 and the PRT 86 to thereby display densities every color patches.

In addition, the μCP 62 of the CAL 52 performs the computation expressed by the equation (1) on the basis of the measured output S3 to calculate a correcting quantity ADJ, thus to send it to the MTC 53 through the I/F 73, and to responds to the command from the MTC 53 through the I/F 73, and to responds to the command from the MTC 53 to perform the computation every ranges $e_1$ to $e_4$ etc. shown in FIG. 3. In the MTC 53, its CPU delivers the correcting quantity ADJ to the CUT 88 as a data signal S5. As a result, the CUT 88 is brought into synchronous state based on the actual measurement central point $P_o$ in FIG. 1 in order to modify its counting state. By repeating such an operation, display of the density values measured actually in correspondence with respective color patches 31 to 34 is conducted in the MCT 51.

Figure 5:
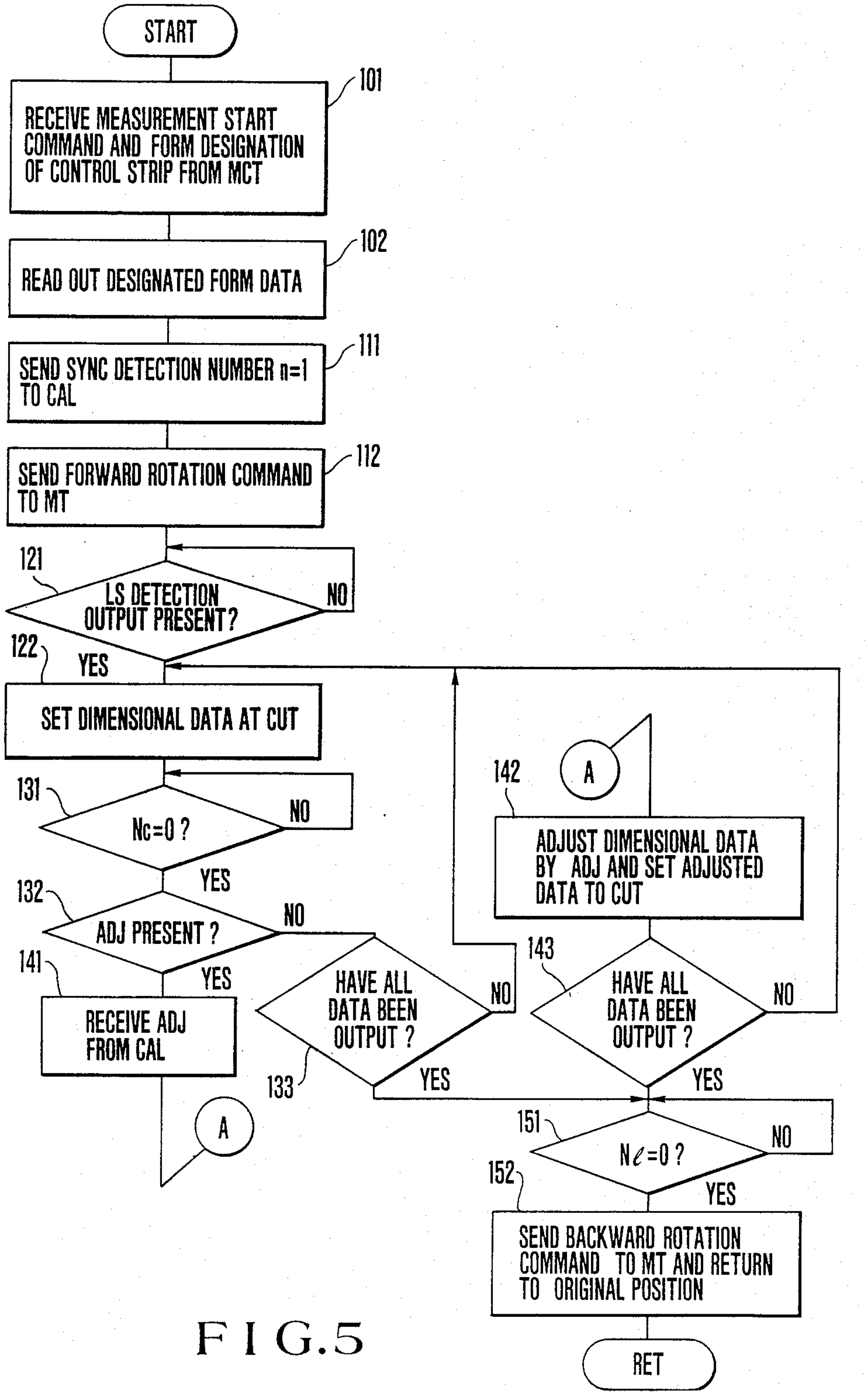
FIGS. 5 to 9(A+B) show flowcharts showing how synchronization control of measurement position is conducted.

FIGS. 5 and 6 are flowcharts showing how the measurement position is controlled in accordance with the method applied to the scanning densitometer of the first type wherein FIG. 5 shows a control program executed by the CPU of the MTC 53 and FIG. 6 shows a control program executed by the CPU of the CAL 52.

In FIG. 5, by step 101 of "receive measurement start command and form designation of control strip from MCT", for designation indicating respective dimensions and the arrangement of color etc. is received. Responding to this, step 102 of "read out designated form data" from form data of various control strips stored in the RAM of the μCP 63 is executed. After step 111 of "send sync (synchronization) detection number n=1" is executed, the drive of the MT 6 is initiated by step 112 of the "send forward rotation command to MT" through the I/F 74. When the result of step 121 of "LS detection output present ?" through the I/F 75 is Y (YES), data indicating the dimension or distance between first patches from the form data is set by step 122 of "set dimensional data to CUT".

The, the CUT 88 responds to the output pulse S7 from the PG 12 to conduct a down count. Thus, when the result of step 131 of "Nc (count value)=0?" is Y, checking indicated by step 132 of "ADJ (synchronization correcting value) present ?" is made in response to data from the CAL 52. In contrast, when the result is N (NO), step 122 and steps subsequent thereto are repeatedly executed through N of step 133 to "have all data been output ?". Thus, mutual dimensions of respective color patches 31 to 34 and beween patches $X_1$ and $X_2$ are set in succession at the CUT 88.

On the contrary, when the result of the step 132 is Y, step 141 of "receive ADJ from CAL" is executed. Then, the count value set at the CUT 88 is corrected by step 142 of "adjust dimensional data by ADJ and set adjusted data at CUT" to repeatedly execute the step 122 and those subsequent thereto through N of step 143 of "have all data been output ?".

When the result of the step 143 becomes Y, step 151 of "Nl (count value)=0?" of the counter for down-counting total movement quantity in the CUT 88 becomes Y. Responding to this, step 152 of "send backward rotation command to M and return to original position' is executed through the I/F 74.

Figure 6A:
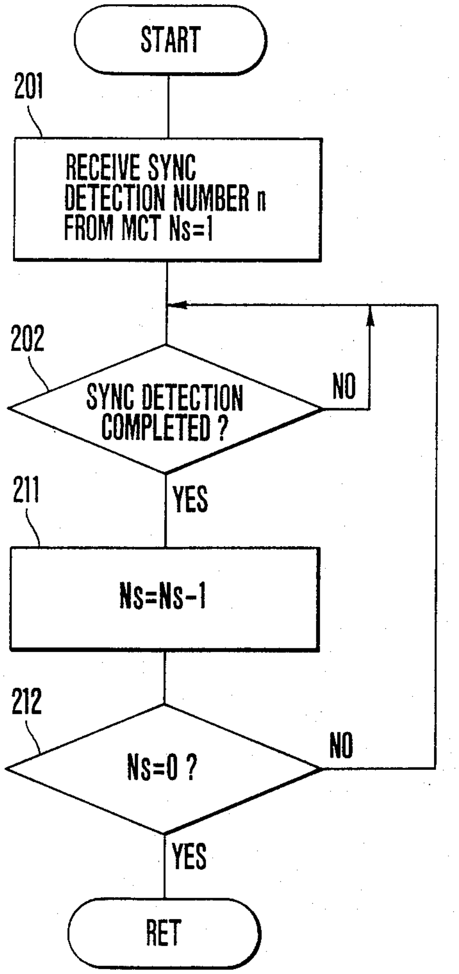
Figure 6B:
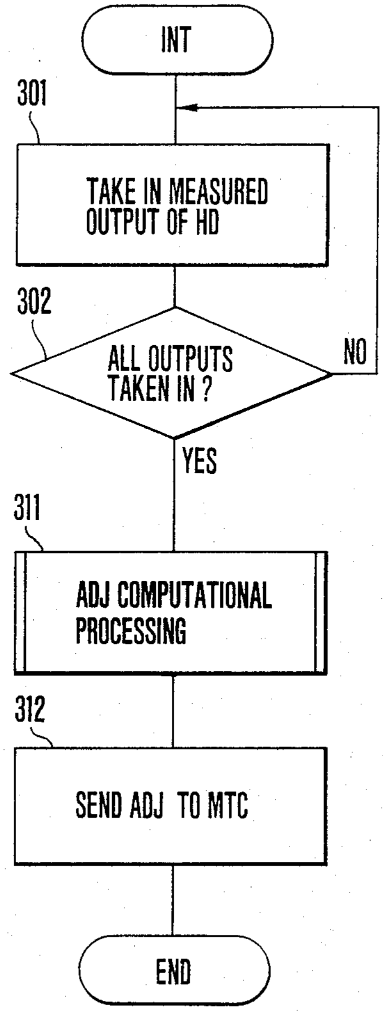

FIG. 6(A) shows a processing in a steady state and FIG. 6(B) shows a processing for interruption. These processings are executed by the CPU of the CAL 52. In FIG. 6(A), by step 201 of "receive sync detection number n, Ns=1" corresponding to the processing at the step 111, the count value Ns =1 is set at the counter for counting detection number constituted by the CPU of the μCP 62. When step 202 of "sync detection completed ?" becomes Y, subtraction is performed by step 211 of "Ns=Ns−1". For a time period during which the result of step 212 of "Ns=0?" is N, the step 202 and those subsequent thereto are executed. Thus, when the result of the step 212 becomes Y, a sequence of control is completed.

The interruption processing shown in FIG. 6(B) is executed in response to the strobe signal S 10. First, step 301 of "take in measured output of HD" is executed. For a time period during which the result of step 302 of "all outputs taken in ?" is N, the step 301 and those subsequent thereto are repeatedly executed to thereby successively store measured data of the control strip 35 into the RAM in the μCP 2 to execute step 311 of "ADJ computational processing" based thereon to execute step 312 of "send ADJ to MTC", the ADJ having been calculated by the above-mentioned step 311.

Figure 7:
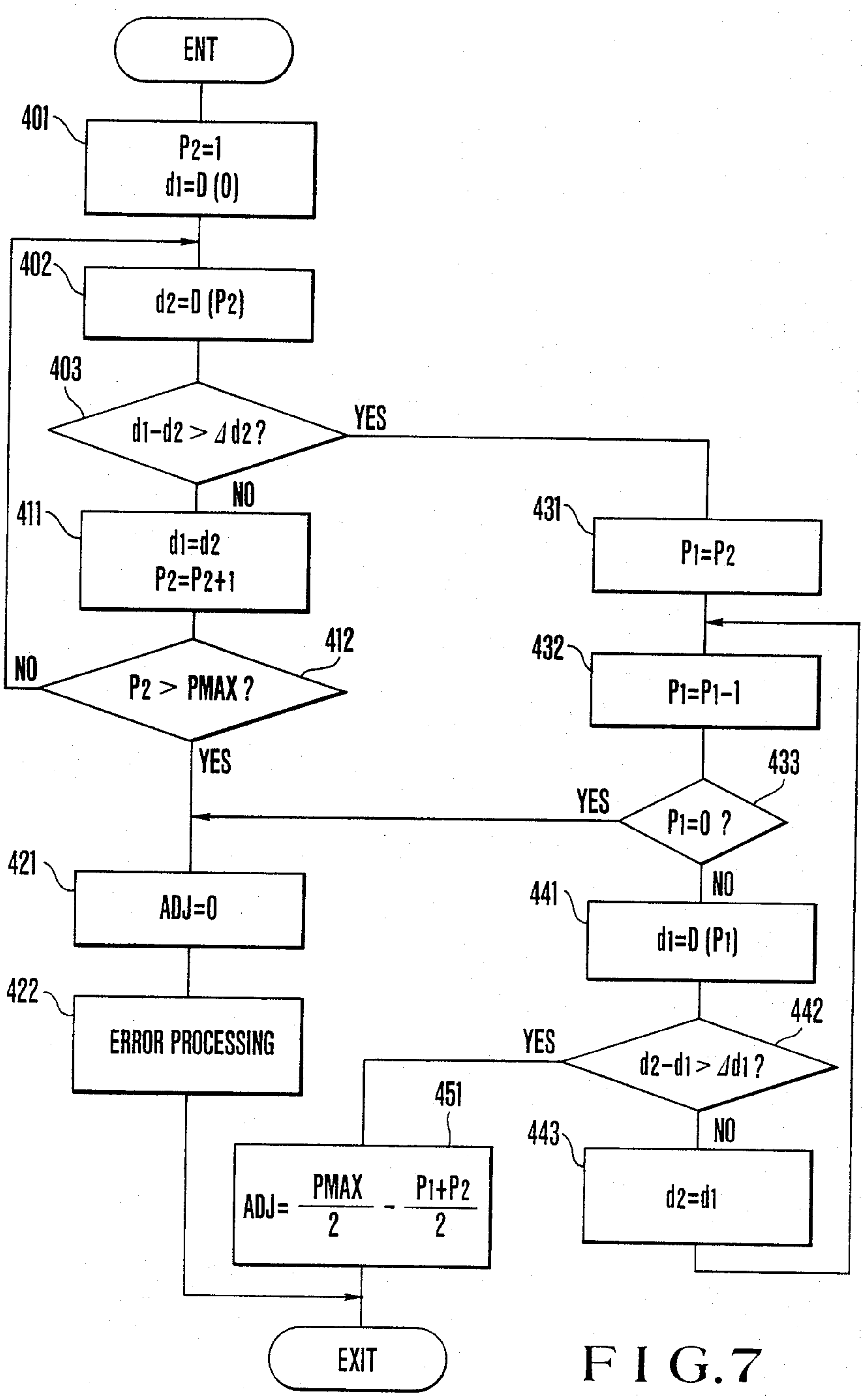

FIG. 7 shows a lower order routine of the step 311 which is executed using respective data D(0) to D(PMAX) of the B patch 31 shown in FIG. 1. By step 401 of "$P_2$ =1, $d_1$ =D(0)", the data number indicating the point $P_2$ in FIG. 1 is set to "1" and data (0) is set as a level $d_1$. Further, by step 402 of "$d_2$ =D($P_2$)", data D($P_2$), i.e., D(1) is set as a level $d_2$. Furthermore, by step 403 of "$d_1 - d_2 > \Delta d_2$ ?", judgement as to whether or not the difference between levels $d_1$ and $d_2$ is above a predetermined level $\Delta d_2$ is made. When the result of the step 403 is N, the previous value $d_2$ is added by step 411 of "$d_1=d_2$, $P_2=P_2+1$". When the result of step 412 of "$P_2>$PMAX ?" is N and for a time period during which $P_2$ is not above the data number 21, the step 402 and those subsequent thereto will be repeatedly executed.

Accordingly, the data D(0) to D(PMAX) in FIG. 1 are compared with they being adjacent to each other by the step 403. Thus, judgement as to whether or not a predetermined level change $\Delta d_2$ is produced is made. When the result of the step 412 becomes Y for a time period during which the result of the step 403 is N, the synchronization correcting quantity becomes equal to zero as indicated by step 421 of "ADJ=0". Thus, since the detection of the point $P_2$ was impossible, an information indicative of abnormal condition etc. is sent to the MTC 53.

On the other hand, when the result of the step 403 bcomes Y, the point $P_2$ can be calculated. The data number D(n) indicated by $P_2=P_2+1$ at this time represents the point $P_2$. The data indicative of the point $P_2$ thus calculated is stored into the RAM of the μCP 62. Then, by step 431 of "$P_1=P_2$", the data number indicating the point $P_1$ is set as that of the point $P_2$. Further, by step 432 of "$P_1=P_1-1$", the data number of the point $P_1$ is subtracted. When the result of step 433 of "$P_1=0$?" is N and for a time period during which the data D(O) is not reached, data D($P_1$) is set at the level $d_1$ by step 441 of "$d_1$=D($P_1$)". Then, by step 442 of "$d_2 - d_1 > \Delta d_1$ ?", judgement as to whether or not the difference between levels $d_2$ and $d_1$ is above a predetermined level $d_1$ is made in the same manner as in the step 403. If the result of the step 442 is N, the previous $d_1$ is replaced by $d_2$ by step 443 of "$d_2=d_1$" thereafter to repeatedly execute the step 432 and those subsequent thereto. If the result of the step 433 becomes Y during this time period, the program execution shifts to the step 421. On the other hand, when the result of the step 442 becomes Y for a time period during which the result of the step 433 is N, the point $P_1$ can be detected. The data number D(n) indicated by $P_1=P_1-1$ at this time represents the point $P_1$. Thus, the computation of step of "ADJ=[PMAX/2]−[($P_1+P_2$)/2] using these points $P_1$ and $P_2$ and the PMAX is performed in the same manner as in the above-mentioned equation (1) to calculate the correcting quantity. Thus, a synchronization detection of one time is completed.

Figure 8:
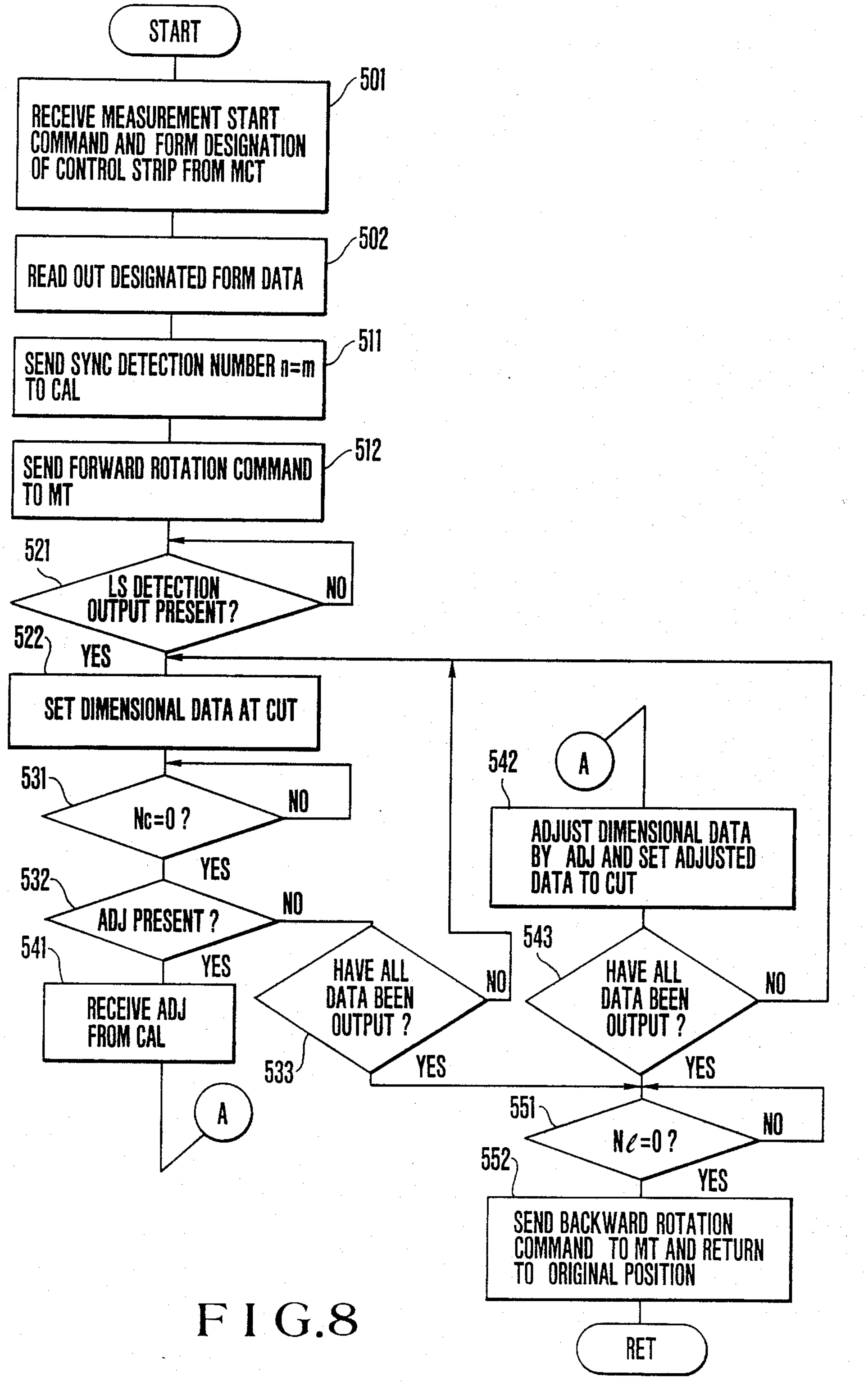
Figure 9A:
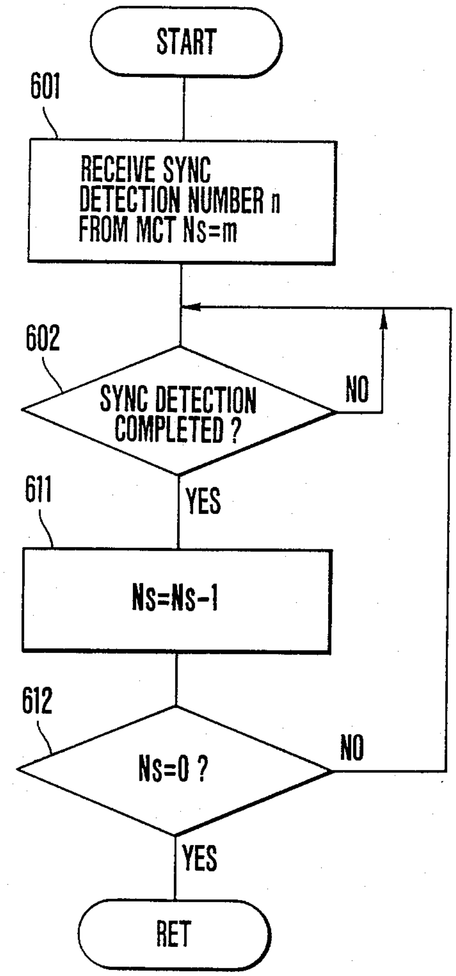
Figure 9B:
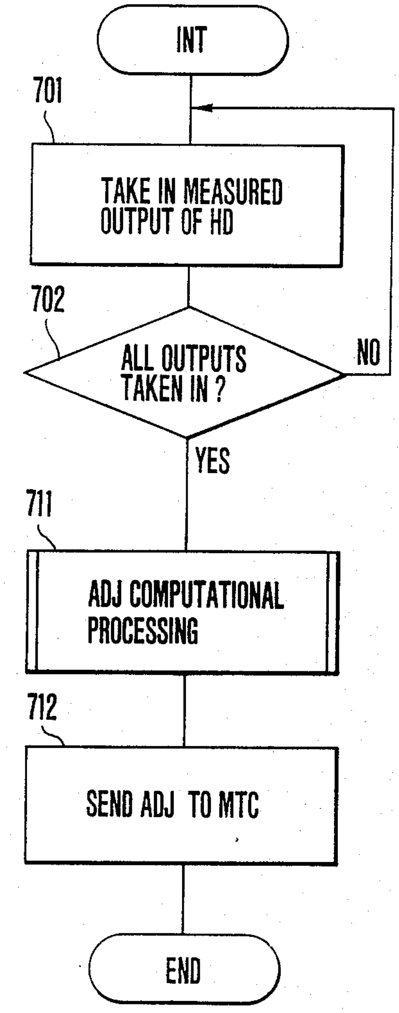

FIGS. 8 and 9 are flowcharts showing how synchronication of measurement position is controlled in accordance with the method applied to the scanning densitometer of the second type. Since the detection of synchronization is carried out every respective ranges $e_1$ to $e_4$ etc. shown in FIG. 3, the setting in step 511 in FIG. 8 is "n=m", the setting in step 601 in FIG. 9 is "n=M", the number of detections m is set to a value large than "1". Other settings except for the above are the same as those in FIGS. 5 and 6. The routine in FIG. 7 is applied to step 711 in FIG. 9 as it it.

Accordingly, by setting in advance data showing e.g. color distinction and arrangement order of the control strip, and dimensions of respective patches etc. using the KB 84, the difference between a scheduled central point and an actual measurement central point of a color patch of a specified color is calculated in accordance with such a setting. Thus, the synchronization setting of the measurement position based thereon is automatically conducted, thus allowing the density measurement of respective color patches to be correct.

It is to be noted that a patch of a color easy to discriminate with respect to other colors may be used as a specified color without use of the B patch.

The selection of the arrangement shown in FIGS. 1 to 4 can be arbitorarily made depending upon circumstances. In the flowcharts in FIGS. 5 to 9, various modifications, e.g., replacing respective steps by other steps identical thereto depending upon conditions, replacement of order, or omission of an unnecessary step or steps may be desirably made.

As is clear from the foregoing description, in accordance with the present invention, even if the relative positional relationship between the scanning densitometer and the control strip becomes inaccurate in dependence upon the mounting condition or expansion and contraction of a paper, or deviation of a printing position etc., synchronization of measurement positions is automatically set in accordance with the form of the control strip, thus making it possible to precisely measure densities every color patches constituting the control strip. Thus, when applied to the scanning densitometer, conspicuous advantages can be obtained.

What is claimed is:

1. A measurement position synchronization method applied to a scanning densitometer to photoelectrically scan a control strip comprising a plurality of color patches of respective colors printed on a paper to thereby calculate densities of said color patches in each color, said method comprising the steps of (a) detecting measured values of scanning a color patch of a specified color;

(b) calculating points which have varied respectively by predetermined levels, on the side of a reference level included in said measured values, (c) determining the intermediate point of said both points to calculate an actual measurement central point of said color patch of said specified color, and (d) carrying out synchronization of measurement positions in accordance with the difference between, scheduled central point and said actual measurement central point.

2. A measurement position synchronization method as set forth in claim 1, wherein said reference level is a flat level extracted from said measured values.

3. A measurement position synchronization method as set forth in claim 1, wherein said step for synchronization includes the steps of correcting measurement position in accordance with a difference between a scheduled central point and said actual measurement central point, and calculating measured values of said respective color patches to thereby conduct synchronization of measurement position.

4. A measurement position synchronization method as set forth in claim 3, wherein a correcting quantity ADJ in said step for correction is computed as a value obtained by subtracting said actual measurement central point from said scheduled central point in accordance with the following equation:

$$ADJ = \frac{PMAX}{2} - \frac{P_1 + P_2}{2}$$

where O to PMAX are determined in accordance with both boundary positions $P_1$, $P_2$ of said color patch of said specified color and PMAX represents a distance between said both boundary positions.

5. A measurement position synchronization method as set forth in claim 1, wherein said color patches are in the form of small square printing surfaces having colors of black, yellow, magenta and cyanogen which are joined to each other.

6. A measurement position synchronization method as set forth in claim 1, wherein the photoelectric scanning of said control strip is carried out by a measurement head of said scanning densitometer.

7. A measurement position synchronization method as set forth in claim 6, wherein the operation of said measurement head is governed by a timing pulse generator and a computer-controlled circuitry under timing control of said timing pulse generator.

8. A measurement position synchronization method as set forth in claim 7, wherein said computer-controlled circuitry comprises at least three units linked with each other, a first unit serving as a motor control unit for controlling a motor which carries out movement of said measurement head, a second unit serving as a calculation unit responsive to an output from said measurement head to perform a predetermined calculation required for synchronization of measurement position, and a third unit serving as a main control unit responsive to said output from said measurement head to effect the entire control of said computer-controlled circuitry including said motor control unit and said calculation unit, said main control unit comprising input means for setting data corresponding to the form of said control strip, and output means including a display unit for displaying densities of said respective color patches.

9. A measurement position synchronization method as set forth in claim 1, said method being applied to a scanning densitometer to photoelectrically scan a control strip comprising a plurality of color patches of respective colors printed on a paper and formed every ranges divided in a transverse direction to thereby calculate densities of said color patches every said respective ranges and every said respective colors.

* * * * *

UNITED STATES PATENT AND TRADEMARK OFFICE

CERTIFICATE OF CORRECTION

PATENT NO. : 4,874,247

DATED : 10/17/89

INVENTOR(S) : Watanabe et al.

It is certified that error in the above-identified patent and that said Letters Patent is hereby corrected as shown below:

| | | |
|---|---|---|
| col. 04, line 40 | delete "$X_{on}$" | insert --$X_l$ on-- |
| col. 05, line 54 | delete "H4" | insert --HD 4-- |
| col. 06, line 11 | delete "$1_h$" | insert --$\ell_h$-- |
| col. 06, line 61 | delete "for" | insert --form-- |
| col. 07, line 06 | delete "The" | insert --Then-- |
| col. 07, line 13 | delete "to" | insert --of-- |
| col. 07, line 15 | delete "beween" | insert --between-- |
| col. 07, line 25 | delete "Nl" | insert --N$\ell$-- |

Signed and Sealed this

Twenty-first Day of May, 1991

*Attest:*

HARRY F. MANBECK, JR.

*Attesting Officer*

*Commissioner of Patents and Trademarks*